Feb. 17, 1942.    P. S. DICKEY ET AL    2,273,779
AIR SEPARATOR AND FILTER
Filed Jan. 3, 1940
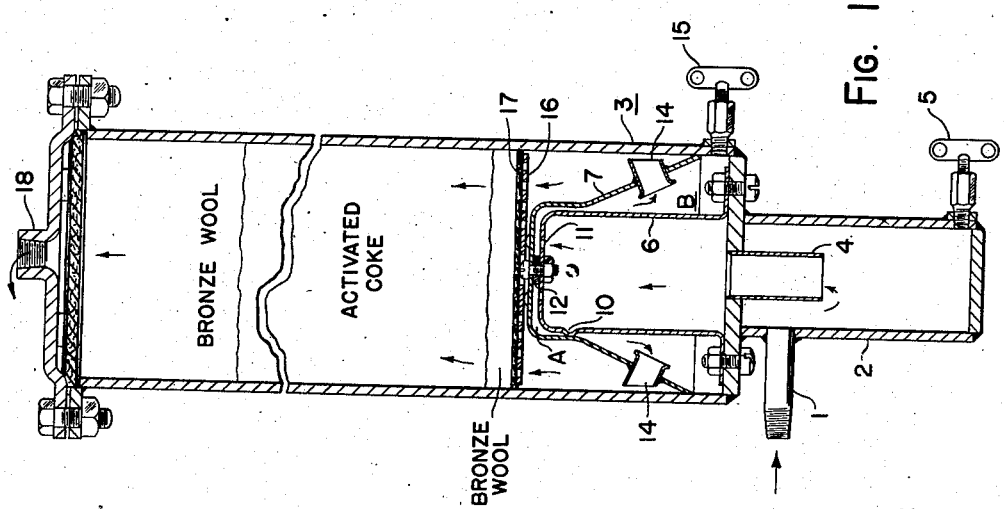
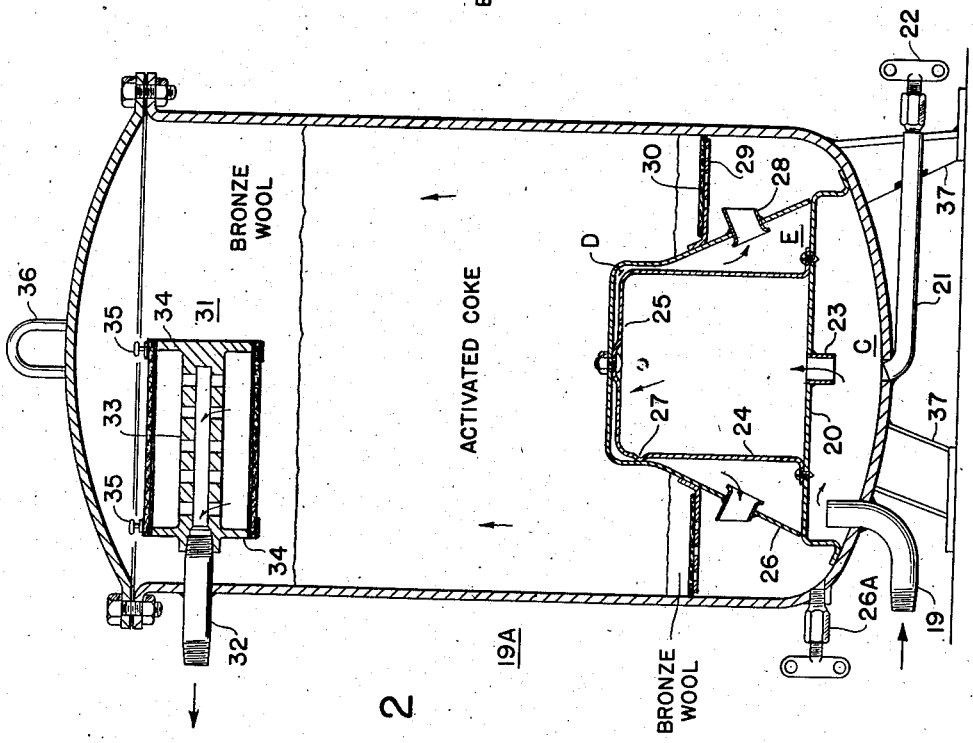
Inventors
PAUL S. DICKEY
AND CLARENCE JOHNSON
By Raymond W. Junkins
Attorney

Patented Feb. 17, 1942

2,273,779

UNITED STATES PATENT OFFICE 2,273,779

AIR SEPARATOR AND FILTER

Paul S. Dickey, Shaker Heights, and Clarence Johnson, Cleveland Heights, Ohio, assignors to Bailey Meter Company, a corporation of Delaware Application January 3, 1940, Serial No. 312,212

6 Claims. (Cl. 183—75)

Our invention relates to air filters or air cleaning devices of the type adapted to be used in a fluid pressure line supplying air for motive purposes or otherwise, for extracting dirt and liquid therefrom. Our invention is particularly adapted for use in a fluid pressure line intermediate a main reservoir or compressor and the point or points of use.

An object of our invention is the provision of a mechanical separator adapted to free the air from liquid such as moisture or oil which may be carried thereby.

Another object is the provision of a strainer or dust and dirt collector in conjunction with said mechanical separator to additionally absorb entrained and suspended matter.

A further object is the provision of a single device including the above mentioned objects.

These and other objects will become apparent upon a study of the attached drawing and description, where:

Fig. 1 represents a cross section of our separating and filtering device.

Fig. 2 is a further representation of a filter device.

In Fig. 1 we show in cross section our improved air separating and filtering device suitable for capacities of free air up to ten cubic feet per minute. For greater capacities a similarly larger device is necessary. Air coming from a reservoir fed by a compressor or directly from a compressor itself usually has suspended in its infinitesimal globules of oil and sometimes of water. The oil is picked up in the compressor while the water may be from moisture laden air taken in by the compressor. Either of the mentioned liquids prove harmful to control systems using air containing them resulting in a rusting action of the control devices or occluding and "gumming" of sensitive parts of a control system thereby preventing their operation or making it sluggish and inaccurate.

The device of Fig. 1 is designed to clean the air of suspended liquids and solids. The air to be cleaned is first fed through a trap composed of inlet pipe 1 and cylindrical chamber 2. The trap is welded to the base of a large enclosed cylinder 3 having its inlet through the trap and exit 18 at its upper end. Cylinder 3 also contains our mechanical separator and additional liquid and dust absorbing means. A conduit connection 4 permits the flow of air from the trap into cylinder 3. This connection extends somewhat below the horizontal trap inlet 1 and directly across the inlet opening causing an initial impingement of incoming air and its subsequent reversal of flow. Some of the heavier and larger suspended matter is thus left behind and is drained off periodically by means of drain cock 5 in the base of the trap.

The cylinder 3 essentially consists of two chambers or devices and generally designated as, first, the mechanical separator and secondly, a filter of some absorbent and straining or cleaning material. Our invention is directed primarily to the mechanical separator and then to its combination with a filter. The materials used in the filter and the separator are rust resisting metals, or metals that have been treated to resist rust. The mechanical separator into which the air from the trap enters by means of pipe 4 consists of a substantially cylindrical member 6 having an integral closed top and a flared flange on the other end and a bell-like member 7 superimposed upon each other, the sides of the bell 7 flaring out at a certain angle to join the inside wall of cylinder 3. The cylindrical member 6 is bolted to the base of cylinder 3 directly above and centrally positioned of the opening of conduit 4 and has a plurality of apertures or orifices 11 circularly arranged and centrally of its top.

The bell 7 lies over and surrounds the cylindrical member 6, being spaced therefrom by dimples 10 and washer 12, forming a condenser chamber A or an enclosure therebetween. Just below the dimples 10 the wall of bell 7 flares outwardly at a predetermined angle to meet the interior wall of cylinder 3. And thus a chamber B is formed by the flared wall of bell 7 and cylindrical member 6 and into which the incoming air expands. Exits 14 are provided from chamber B and consist of a plurality of short conduits flared at their inner ends to precent any liquid from flowing into them. A drain cock 15 is provided for periodically draining this chamber of any accumulated liquid.

On top of bell 7 rests a perforated circular partition 16 substantially the size of the interior of cylinder 3. This partition in effect separates the upper filter portion of cylinder 3 from the lower or mechanical separator portion. On this partition rests a layer of felt material 17 and on top of it a layer of bronze wool, then a substantial depth of activated coke such as "Nuchar," another layer of bronze wool, and lastly another felt layer, held between two bronze or monel screens.

In this filtering portion the first layer of felt prevents any activated coke from dropping below partition 16. The bronze wool will take out any entrained corrosive liquids or gases, while the activated coke will readily absorb any liquid that had not previously been taken out.

Now, in operation, the air entering through inlet 1 impinges on conduit 4, and loses a good deal of its velocity upon expanding into chamber 2. It then reverses and flows upwardly through constriction 4 to the interior of cylinder 6. Any liquid and other matter freed by the impingement, expansion and reversal finds its way to the base of chamber 2 whence it is periodically drained off by valve 5.

The air again expands into cylinder 6 and any velocity it acquired as a result of flowing through the constriction 4 is lost upon expansion. The orifices 11 in cylinder 6 divide the air from the bell chamber into a plurality of jets, each jet impinging the interior surface of the bell 7 leaving thereon the greater portion of entrained liquid it may have had, and which liquid collects to wet or film the walls of chamber A thence following the walls of chamber B to accumulate at the base of cylinder 3 and to be drained off. However, the flowing liquid, because of the closeness of the bell walls, will be thereby retarded, forming a restricted passage between wetted walls and through which the air must flow. The inner wall of the bell 7 and the outer wall of the cylinder 6 are in fact so close together between chambers A and B that a liquid film may substantially close the passage. The result is that the air has in many instances to pass through a pool of the liquid, or to flow in an extremely thin film between the close wetted walls. This further causes the air to yield more of its carried liquid. The jets and the condensing chamber A cause an increase in velocity of the stream of air and this velocity is again reduced when the air expands into chamber B. From chamber B air escapes by means of exits 14 to flow upwardly through the perforated plate 16 and through the filtering material to the exit 18.

It must be appreciated that a definite treatment of the air stream takes place during its flow path through our mechanical separator. We repeatedly cause a reversal of flow, an expansion and contraction of the air stream, division into a plurality of streams, impingement, change in velocity, and also forcing its flow through a very thin annular pool of extracted liquid. The positions and sizes of expanding chambers, the number of orifices for air stream division, the degree of wall flare and the spacing of walls have been all predetermined and perform a certain part in causing the air to yield its entrained matter.

In Fig. 2 we show a similar device except as to capacity. The various parts are of substantially the same design except adapted to accommodate greater capacities of air. We show an enclosed cylinder 19A supported on legs 37 and to which air under pressure is admitted to a first chamber C or trap, through the curved inlet pipe 19 to impinge upon a base 20 holding a cylinder member 24 and a bell-like member 26. Base 20 in this device is a built-in base forming chamber C with the bottom of cylinder 19A as well as supporting members 24 and 26. The air stream is caused to reverse itself upon striking base 20 and expands into chamber C, its velocity being decreased. All freed matter due to the initial impingement collects in the base of the chamber and is drained therefrom by pipe 21 and drain cock 22. The air from chamber C then flows through the centrally positioned constriction 23 into the interior of cylinder 24 wherein it is further expanded.

In the top of cylinder 24 there are a plurality of orifices 25 which divide the air stream into a plurality of jets impinging an obstructing wall of condensing chamber D formed by the cylinder 24 and bell 26. The impingement of these several jets on the facing wall cause a release of entrained liquid which merges and flows outwardly to be slightly retarded by the closeness of the bell walls, the clearance determined therebetween by dimples 27. The unified air from the chamber must flow through the annular pool of retarded liquid and thereby yield a further amount. The liquid then drains down the walls of cylinder 24 and bell 26 and through a small annular opening made between the flared wall of bell 26 with base 20 where it accumulates to be periodically drained off by drain cock 26A.

Air emerging from chamber D is expanded into chamber E, its velocity thereby decreased and it then flows out through exits 28 and upwardly through a perforated partition 29, filtering material 30 of felt, bronze wool, activated coke, bronze wool and a felt encased cylinder 31.

This cylinder 31 is closed at one end and has an interiorly perforated cylindrical core 33 having a hollow center and joins therewith the exit pipe 32. Flanges 34 at each end of core 33 serve as a means for winding thereon a metal screen and on it a thickness of felt. Circular clamps 35 hold the felt and screen tightly to the flanges. We use such final filter device as 31 in order that we may utilize a side exit means, leaving the top of main cylinder 19A free for uses as affixing thereon a yoke or hook means 36 facilitating transportation and positioning of the unit.

The effectiveness and efficiency of the arrangements described rests upon a combination of mechanical separation and filtering of oil, water, dirt, etc. from the air. The mechanical separator combines changes in direction of flow, changes in velocity and impingement; all of which aid in effective separation of liquid from the air.

In general, the air to be cleaned, first passes through a trap to remove any entrained moisture or oil precipitated by reduction in pressure through an external reducing valve. The air is next passed through a mechanical separator, the action being to discharge the air in a number of jets against a flat surface, allow a reversal of flow through a relatively long opening of small width which condenses oil on the walls enclosing the opening, and then breaks the walls away slowly enough so that condensed oil or water stays on the walls, draining to a sump. The air next receives a reversal in direction and passes through relatively large openings in a distributing baffle which serves as a support for the filtering material through which the air next passes.

Thus we have disclosed an air straining device that is highly efficient and one readily applicable to any system needing clean air and while having made reference to bronze wool, activated coke and felt as an additional straining and filtering material it must be understood that, although we stated a preference therefor, any other combination of materials capable of performing a similar function may be utilized. As to the mechanical separator we further know that it may be changed in form and position by those skilled in the art and that the two forms disclosed are examples merely embodying the principles which we hereinafter claim. We therefore do not wish to be limited otherwise than by the scope of the appended claims in view of prior art.

What we claim as new, and desire to secure by Letters Patent of the United States, is:

1. In an air straining device for fluid pressure systems comprising in combination, a cylindrical casing, inlet means for said air under pressure to said casing, a trap for said air attached to the base of said casing, a substantially cylindrical member having closed top positioned above said trap and in said casing, a conduit joining said trap and said cylindrical member, a plurality of orifices in said cylindrical member, a bell-like member its walls covering and partially clamping said cylindrical member, a condensing chamber formed by said cylindrical and bell-like members, said orifices permitting entry of said air into said condensing chamber.

2. An air straining device for fluid pressure systems comprising in combination, a cylindrical casing, inlet means for air under pressure to said casing, a trap for said air, said trap attached to the base of said casing, a substantially cylindrical member having a closed top positioned above said trap and in said casing, a conduit joining said trap and the interior of said cylindrical number, a plurality of orifices in the top of said cylindrical member for dividing said air into a plurality of streams, a bell-like member covering said cylindrical member its walls partially clamping said cylindrical member thence angularly diverging, a condensing chamber formed by said cylindrical and bell-like members having said orifices as air inlet means thereto, nipples in the side walls of said cylindrical member for maintaining a predetermined clearance between the walls of cylindrical and bell-like members permitting drainage therethrough, an annular expansion chamber for said air formed by said cylindrical and bell-like members and a plurality of exhaust ports in the diverging wall of said bell-like member.

3. An air cleaning device for removing entrained foreign matter such as oil from compressed air, comprising, a substantially cylindrical member having a closed top, a bell-like member adapted to fit over said cylindrical member, spacing means for maintaining the top of said bell-like member a predetermined distance from the top of said cylindrical member to form a passageway for the compressed air, and a plurality of orifices in the top of said cylindrical member adjacent the center thereof to provide an inlet to said passageway.

4. An air cleaning device for removing suspended foreign matter such as oil from compressed air, comprising, a substantially cylindrical member having a closed top, a bell-like member having a similarly shaped closed top of slightly larger diameter and an outwardly flared skirt section, said bell-like member adapted to fit over said cylindrical member, an opening in the top of said cylindrical member for admitting compressed air between the exterior of the cylindrical member and the interior of the bell shaped member, and an opening in the skirt of said bell-like member for permitting the compressed air to escape from between the cylindrical and bell shaped members.

5. An air cleaning device for removing foreign matter such as oil from compressed air, comprising in combination, a cylindrical housing having a closed top and bottom, a hollow cylindrical member having an integral closed top and a flared flange at the other end adapted to engage the bottom of said housing, a bell-like member enveloping said cylindrical member and having an outwardly flared skirt, means substantially sealing the opening between the bottom of said skirt and the exterior wall of said cylindrical member, a plurality of orifices in the top of said cylindrical member for permitting the entrance of the compressed air between the cylindrical and bell-shaped members, and a discharge nozzle in the skirt of said bell member for permitting the escape of compressed air from the space between said cylindrical and bell-shaped members.

6. An air cleaning device for removing oil from compressed air, comprising a pair of elements having plane, parallel portions spaced apart a relatively small distance to form a thin passageway therebetween, an orifice near the center of one of said plane portions for admitting air to said passageway for flow radially outward between said plane portions to gradually decrease the velocity of said air when passing between said plane portions, said plane portions being so spaced that the air in passing through said orifice has attained its maximum velocity at the time of impingement.

PAUL S. DICKEY.
CLARENCE JOHNSON.